United States Patent
Lei et al.

(10) Patent No.: US 12,294,463 B2
(45) Date of Patent: May 6, 2025

(54) MESSAGE B CHANNEL STRUCTURE

(71) Applicant: QUALCOMM Incorporated, San Diego, CA (US)

(72) Inventors: Jing Lei, San Diego, CA (US); Ruiming Zheng, Beijing (CN); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 420 days.

(21) Appl. No.: 17/754,184

(22) PCT Filed: Oct. 28, 2019

(86) PCT No.: PCT/CN2019/113581
§ 371 (c)(1),
(2) Date: Mar. 25, 2022

(87) PCT Pub. No.: WO2021/081691
PCT Pub. Date: May 6, 2021

(65) Prior Publication Data
US 2022/0294574 A1  Sep. 15, 2022

(51) Int. Cl.
*H04L 1/1829* (2023.01)
*H04L 1/1822* (2023.01)
(Continued)

(52) U.S. Cl.
CPC .......... *H04L 1/1854* (2013.01); *H04L 1/1822* (2013.01); *H04L 1/1864* (2013.01);
(Continued)

(58) Field of Classification Search
CPC ............. H04W 56/0045; H04W 8/186; H04W 74/0833; H04W 72/04; H04W 76/19; H04L 1/08; H04L 1/1825; H04L 5/0053
See application file for complete search history.

(56) References Cited

U.S. PATENT DOCUMENTS

| 10,512,075 B2 | 12/2019 | Wilson et al. |
| 2016/0338093 A1 | 11/2016 | Frenne et al. |

(Continued)

FOREIGN PATENT DOCUMENTS

| CN | 109155694 A | 1/2019 |
| CN | 109792331 A | 5/2019 |

(Continued)

OTHER PUBLICATIONS

International Search Report and Written Opinion—PCT/CN2019/113581—ISA/EPO—Mar. 30, 2020.

(Continued)

*Primary Examiner* — Iqbal Zaidi
(74) *Attorney, Agent, or Firm* — Harrity & Harrity, LLP

(57) ABSTRACT

Various aspects of the present disclosure generally relate to wireless communication. In some aspects, a base station (BS) may configure a physical downlink control channel (PDCCH) component of a message B (msgB) communication to include a first portion of the signaling information for physical uplink control channel (PUCCH) for hybrid automatic repeat request (HARQ) feedback associated with the msgB communication and the signaling information for HARQ combining of msgB. The BS may configure a physical downlink shared channel (PDSCH) component of the msgB communication to include a second portion of the signaling information for PUCCH and msgB HARQ combining. The distributed mapping for the signaling information to the PDCCH and PDSCH components of msgB can be indicated by system information, RRC signaling, or hard coded in specifications. The BS may transmit the msgB communication to one or more UEs. Numerous other aspects are provided.

30 Claims, 11 Drawing Sheets

(51) Int. Cl.
  *H04L 5/00* (2006.01)
  *H04W 72/20* (2023.01)
(52) U.S. Cl.
  CPC .......... *H04L 5/0044* (2013.01); *H04L 5/0048* (2013.01); *H04W 72/20* (2023.01)

(56) References Cited

U.S. PATENT DOCUMENTS

| | | | |
|---|---|---|---|
| 2019/0150192 A1 | 5/2019 | He et al. | |
| 2021/0168874 A1* | 6/2021 | Wei | H04W 72/23 |
| 2021/0329704 A1* | 10/2021 | Yang | H04L 5/001 |
| 2022/0225428 A1* | 7/2022 | Xiong | H04L 1/1864 |

FOREIGN PATENT DOCUMENTS

| | | |
|---|---|---|
| CN | 109983829 A | 7/2019 |
| WO | 2018144168 | 8/2018 |

OTHER PUBLICATIONS

3GPP TS 38.321: "3rd Generation Partnership Project, Technical Specification Group Radio Access Network, NR, Medium Access Control (MAC) protocol specification (Release 15)", 3GPP TS 38.321 V15.7.0, Mobile Competence Centre, 650, Route Des Lucioles, F-06921 Sophia-Antipolis Cedex, France, Sep. 27, 2019, pp. 1-77, XP051799979, Section 1, 5.1, 6.2.2.
Motorola Mobility., et al., "2-step RACH Procedure", 3GPP TSG RAN WG1 #98bis, R1-1911035, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14-Oct. 20, 2019, Oct. 5, 2019, pp. 1-6, XP051808801, The Whole Document.
Nokia., et al., "Feature Lead Summary#75 on 2 step RACH Procedures", 3GPP TSG RAN WG1 #98bis, R1-1911659, 3rd Generation Partnership Project (3GPP), Mobile Competence Centre, 650, Route Des Lucioles, F-06921 Sophia-Antipolis, vol. RAN WG1, No. Chongqing, China, Oct. 14-Oct. 18, 2019, Oct. 22, 2019, pp. 1-67, XP051798901, Section 1, 3.3, 8.10.
Qualcomm Incorporated: "Procedures for Two-Step RACH", 3GPP TSG-RAN WG1 Meeting #98bis, R1-1911406, 3rd Generation Partnership Project (3GPP), Mobile Competence Centre, 650, Route Des Lucioles, F-06921, Sophia-Antipolis Cedex, France, vol. RAN WG1, No. Chongqing, P. R. China, Oct. 14-Oct. 20, 2019, Oct. 22, 2019, pp. 1-15, XP051798680, The Whole Document.
Supplementary European Search Report—EP19950860—Search Authority—The Hague—May 11, 2023.
Huawei, et al., "Discussion on msgB for 2-step RACH", 3GPP TSG-RAN WG2 Meeting #105bis, R2-1904113, Xi'an, China, Apr. 8-12, 2019, 4 pages.

* cited by examiner

| Last MAC Sub-PDU Indicator | RAR Type Indicator | | Quantity of RARs | | Common PUCCH Signaling Information | |
|---|---|---|---|---|---|---|
| E | Bit 1 | Bit 2 | Bit 1 | Bit 2 | Bit 1 | Bit 2 |

| RAR Type Indicator | | Quantity of RARs | | Common PUCCH Signaling Information | | |
|---|---|---|---|---|---|---|
| Bit 1 | Bit 2 | Bit 1 | Bit 2 | Bit 1 | Bit 2 | Bit 3 |

FIG. 3D

| RAR Type | RAR Type Indicator | |
|---|---|---|
| | Bit 1 | Bit 2 |
| Backoff Indicator | 1 | 1 |
| Fallback RAR | 1 | 0 |
| Success RAR with RRC Message | 0 | 1 |
| Success RAR without RRC Message | 0 | 0 |

FIG. 3E

MESSAGE B CHANNEL STRUCTURE

CROSS-REFERENCE TO RELATED APPLICATION

This application is a 371 national stage of PCT Application No. PCT/CN2019/113581 filed on Oct. 28, 2019, entitled "MESSAGE B CHANNEL STRUCTURE," which is hereby expressly incorporated by reference herein.

FIELD OF THE DISCLOSURE

Aspects of the present disclosure generally relate to wireless communication and to techniques and apparatuses for configuring a message B channel structure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include configuring a physical downlink control channel (PDCCH) component of a message B (msgB) communication to include a first portion of physical uplink control channel (PUCCH) signaling information for hybrid automatic repeat request (HARQ) feedback associated with the msgB communication; configuring a physical downlink shared channel (PDSCH) component of the msgB communication to include a second portion of the PUCCH signaling information; and transmitting the msgB communication to one or more UEs.

In some aspects, a method of wireless communication, performed by a UE, may include receiving a msgB communication; identifying a first portion of PUCCH signaling information for HARQ feedback associated with the msgB communication included in a PDCCH component of the msgB communication; and identifying a second portion of the PUCCH signaling information included in a PDSCH portion of the msgB communication.

In some aspects, a BS for wireless communication may include memory and one or more processors operatively coupled to the memory. The memory and the one or more processors may be configured to configure a PDCCH component of a msgB communication to include a first portion of PUCCH signaling information for HARQ feedback associated with the msgB communication; configure a PDSCH component of the msgB communication to include a second portion of the PUCCH signaling information; and transmit the msgB communication to one or more UEs.

In some aspects, a UE for wireless communication may include memory and one or more processors operatively coupled to the memory. The memory and the one or more processors may be configured to receive a msgB communication; identify a first portion of PUCCH signaling information for HARQ feedback associated with the msgB communication included in a PDCCH component of the msgB communication; and identify a second portion of the PUCCH signaling information included in a PDSCH component of the msgB communication.

In some aspects, a non-transitory computer-readable medium may store one or more instructions for wireless communication. The one or more instructions, when executed by one or more processors of a BS, may cause the one or more processors to configure a PDCCH component of a msgB communication to include a first portion of PUCCH signaling information for HARQ feedback associated with the msgB communication; configure a PDSCH component of the msgB communication to include a second portion of the PUCCH signaling information; and transmit the msgB communication to one or more UEs.

In some aspects, a non-transitory computer-readable medium may store one or more instructions for wireless communication. The one or more instructions, when executed by one or more processors of a UE, may cause the one or more processors to receive a msgB communication; identify a first portion of PUCCH signaling information for HARQ feedback associated with the msgB communication included in a PDCCH component of the msgB communication; and identify a second portion of the PUCCH signaling information included in a PDSCH component of the msgB communication.

In some aspects, an apparatus for wireless communication may include means for configuring a PDCCH component of a msgB communication to include a first portion of PUCCH signaling information for HARQ feedback associated with the msgB communication; means for configuring a PDSCH component of the msgB communication to include a second portion of the PUCCH signaling information; and means for transmitting the msgB communication to one or more UEs.

In some aspects, an apparatus for wireless communication may include means for receiving a msgB communication; means for identifying a first portion of PUCCH signaling information for HARQ feedback associated with the msgB communication included in a PDCCH component of the msgB communication; and means for identifying a second portion of the PUCCH signaling information included in a PDSCH component of the msgB communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3G are diagrams illustrating one or more examples of configuring a message B channel structure, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
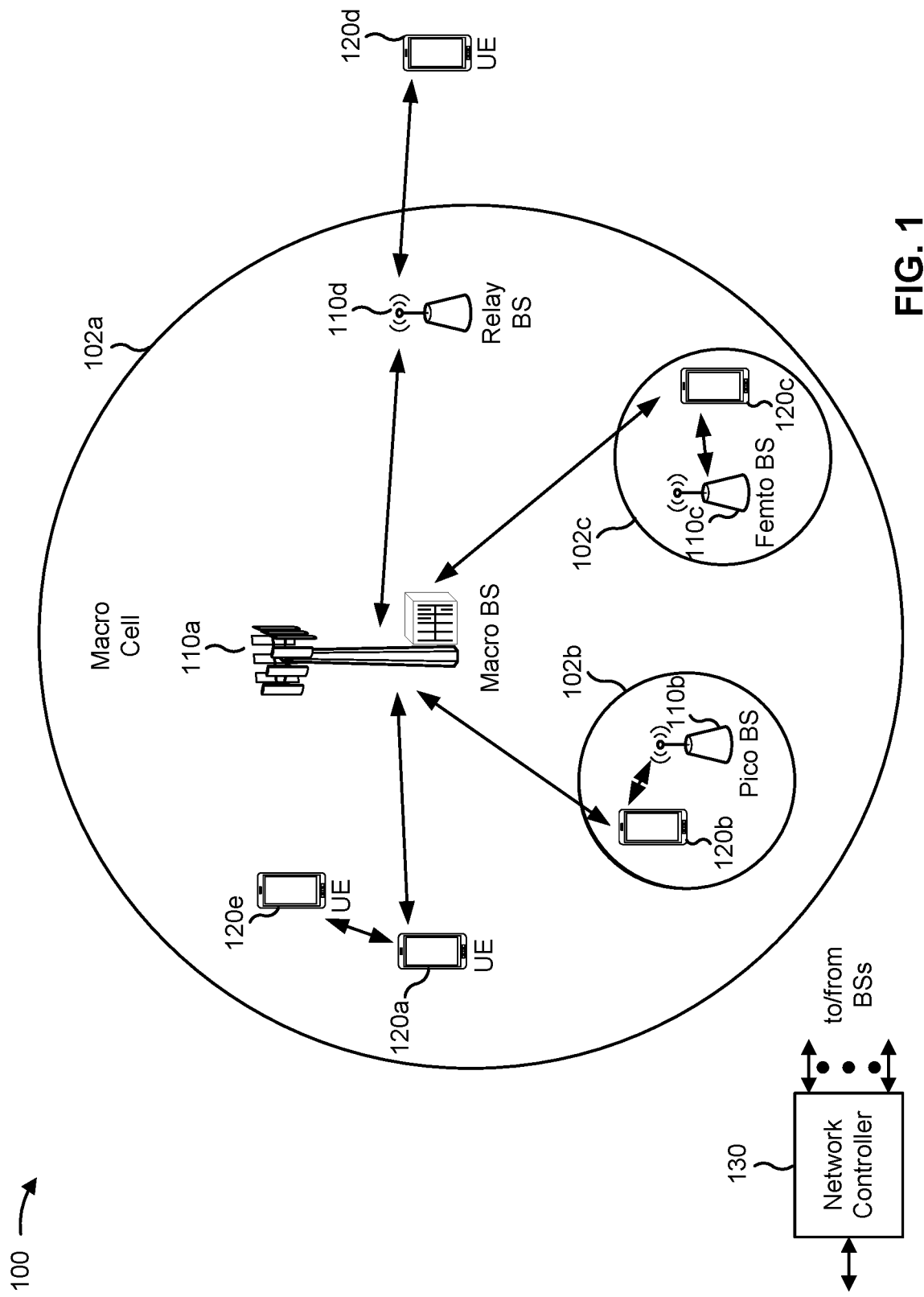
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
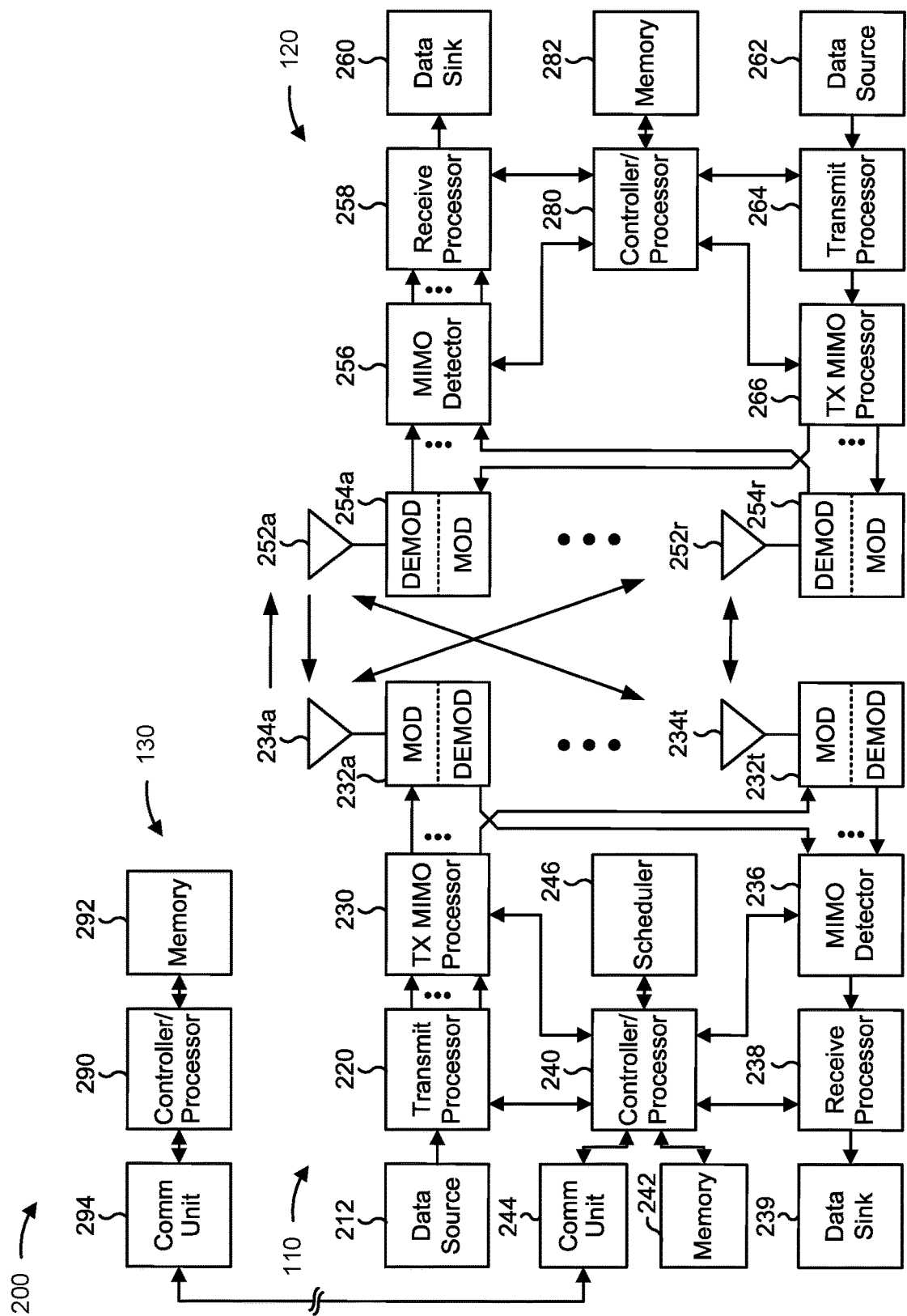
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a message B (msgB) channel structure, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving a msgB communication, means for identifying a first portion of physical uplink control channel (PUCCH) signaling information for hybrid automatic repeat request (HARD) feedback associated with the msgB communication included in a physical downlink control channel (PDCCH) component of the msgB communication, means for identifying a second portion of the PUCCH signaling information included in a physical downlink shared channel (PDSCH) component of the msgB communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring a PDCCH component of a msgB communication to include a first portion of PUCCH signaling information for HARQ feedback associated with the msgB communication, means for configuring a PDSCH component of the msgB communication to include a second portion of the PUCCH signaling information, means for transmitting the msgB communication to one or more UEs 120, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may access a wireless network by negotiating a connection with a BS included in the wireless network. During connection establishment, the UE and the BS may synchronize the connection in the downlink direction (that is, from BS to UE) and in the uplink direction (that is, from UE to BS).

To synchronize the connection in the downlink direction, the UE may read a synchronization signal block (SSB) that includes various synchronization signals transmitted from the BS. The synchronization signals may include a primary synchronization signal (PSS), a secondary synchronization signal (SSS), a primary broadcast channel (PBCH), and/or the like. The UE may use the PSS to determine symbol timing in the downlink direction, may use the SSS to determine a physical cell identifier associated with the BS, and may use the PBCH to determine the frame timing.

To synchronize the connection in the uplink direction, the UE and the BS may perform a random access channel (RACH) procedure. In some aspects, the UE and the BS may perform a four-step RACH procedure. In a four-step RACH procedure, the UE and the BS may exchange four primary RACH communications. The UE may transmit a Message 1

(msg1) communication to the BS (e.g., as defined in a 3GPP four-step RACH procedure). The msg1 communication may be a RACH preamble communication that is transmitted in a RACH occasion (e.g., a particular set of time-frequency resources), the combination of which may be referred to as a RACH signature. The BS may respond to the msg1 communication with a Message 2 (msg2) communication (e.g., as defined in a 3GPP four-step RACH procedure), which may be a random access response (RAR) communication. The UE may respond to the msg2 communication with a Message 3 (msg3) communication (e.g., as defined in a 3GPP four-step RACH procedure), which may be a radio resource control (RRC) connection request communication. The BS may respond to the msg3 communication with a Message 4 (msg4) communication (e.g., as defined in a 3GPP four-step RACH procedure), which may be a medium access control (MAC) control element (MAC-CE) contention resolution identifier communication and may include an RRCSetup command, and/or the like.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a communication referred to as a message A (msgA) communication (e.g., as defined in a 3GPP two-step RACH procedure). The msg1 component of the msgA communication may be referred to as the preamble component of the msgA communication. The msg3 component of the msgA communication may be referred to as the payload component of the msgA communication. The UE may transmit the msg1 component and the msg3 component sequentially and prior to receiving the msg2 communication and the msg4 communication.

The BS may receive the msgA communication and may transmit a msgB communication (e.g., as defined in a 3GPP two-step RACH procedure), which may include the msg2 communication and the msg4 communication. The msgB communication may include a PDCCH component and a PDSCH component. The PDSCH component may carry the payload of the msgB communication, which may include one or more RARs directed to one or more UEs.

A RAR may be a fallback RAR, a success RAR (with or without an associated radio resource control (RRC) message), a backoff indicator, and/or the like. A fallback RAR may be transmitted if the preamble component of the msgA communication is detected and decoded but not the payloadcomponent. A fallback RAR may indicate to the UE to fall back to a four-step RACH procedure, and may include a random access preamble identifier (RAPID) for the UE, an RAR grant, a timing advance command, and a temporary cell radio network temporary identifier (TC-RNTI) for retransmitting the msg3 or payload component of the msgA communication. A success RAR may be transmitted if the preamble component and the payload component are detected and decoded. A success RAR may indicate to the UE to proceed with the two-step RACH procedure, and may identify a contention resolution identifier, a timing advance command, and a cell radio network temporary identifier (C-RNTI).

A UE may monitor for a msgB communication during an RAR reception window. The starting point of the RAR reception window may be aligned with the first PDCCH symbol of the earliest search space for the msgB communication. If the UE does not receive a success RAR or fallback RAR by the expiration of the RAR reception window, the UE may retransmit the msgA communication.

In some cases, a BS may include PUCCH signaling information in a msgB communication directed to a UE. The PUCCH signaling information may include one or more parameters for transmitting HARQ feedback (e.g., an acknowledgement (ACK) or a negative acknowledgment (NACK)) associated with the msgB communication to the BS on an uplink. The BS may include the PUCCH signaling information in downlink control information (DCI) in the PDCCH component of the msgB communication.

As the quantity of UEs deployed in a wireless network increases, it may be desirable to conserve radio resources by having a BS multiplex a plurality of RARs to a plurality of UEs in a single msgB communication. However, due to the limited space allocated to DCI in the PDCCH component of the msgB communication, the BS may be unable to include PUCCH signaling information for each of the plurality of UEs in the DCI.

Some aspects, described herein, provide techniques and apparatuses for a msgB channel structure that permits a plurality of RARs to be multiplexed in a single msgB communication along with PUCCH signaling information directed to a plurality of UEs. In some aspects, a BS may distribute the PUCCH signaling information across the PDCCH component (e.g., in DCI) and the PDSCH component (e.g., in one or more medium access control (MAC) sub-headers and/or one or more MAC sub-protocol data units (PDUs)) of the msgB communication. In this way, the BS may maintain the size of existing DCI formats while including PUCCH signaling information directed to the plurality of UEs in a single msgB communication. Moreover, signaling information for MAC sub-PDU combining may be distributed across the PDCCH component and the PDSCH component in a similar manner to increase the ability of the plurality of UEs to perform MAC sub-PDU combining as part of a HARQ process.

Some aspects, described herein, introduce a common MAC sub-header, which may be used to aggregate and/or group a plurality of MAC sub-PDUs carrying the same type of RAR, as well as may be used to carry common PUCCH signaling information for the plurality of UEs. The common MAC sub-header may reduce overhead of the overall MAC PDU in the PDSCH component of the msgB communication by reducing the quantity of MAC sub-headers in the MAC PDU (e.g., relative to including a respective MAC sub-header for each of the MAC sub-PDUs), by permitting common PUCCH signaling information to be included in a single location or fewer locations in the PDSCH component, and/or the like.

To further decrease processing, memory, and power resource consumption at the UEs, the BS may multiplex the same type of RARs and/or different types of RARs in the same msgB communication, which permits success RARs, fallback RARs, initial RAR transmissions, and/or RAR retransmissions to be included in the same msgB communication. The BS may also provide an early indication of which msgB communication will carry an RAR directed to a particular UE or group of UEs, which further decreases processing, memory, and power resource consumption at the UEs.

FIGS. 3A-3G are diagrams illustrating one or more examples 300 of configuring a msgB channel structure, in accordance with various aspects of the present disclosure. As shown in FIGS. 3A-3G, example(s) 300 may include communication between a BS (e.g., BS 100) and a plurality of UEs (e.g., UE 120), such as UE1-UEn, and/or the like. The BS and the plurality of UEs may be included in a wireless network, such as wireless network 100 and/or the like.

In some aspects, each of the plurality of UEs may perform a RACH procedure with the BS to establish a wireless connection with the BS. The RACH procedure may include, for example, a two-step RACH procedure, a four-step RACH procedure, and/or the like. In some aspects, a UE of the plurality of UEs may initiate a two-step RACH procedure by transmitting a msgA communication to the BS. In this case, the UE may transmit a preamble component of the msgA communication in a preamble occasion (e.g., one or more time-frequency resources configured for RACH preamble transmission), and may transmit a payload component of the msgA communication in a PUSCH occasion (e.g., one or more time-frequency resources configured for msgA payload transmission).

The BS may respond to msgA communications from one or more of the plurality of UEs by transmitting a msgB communication to the one or more of the plurality of UEs. In some aspects, the BS may transmit a respective msgB communication for each received msgA communication, where each respective msgB communication includes a RAR directed to a particular UE. In some aspects, the BS may multiplex RARs directed to a plurality of UEs in a single msgB communication. In some aspects, the BS may configure a msgB communication to include PUCCH signaling information for providing HARQ feedback associated with the msgB communication. In this case, the PUCCH signaling communication may be directed to a single UE or to a plurality of UEs.

Figure 3A:
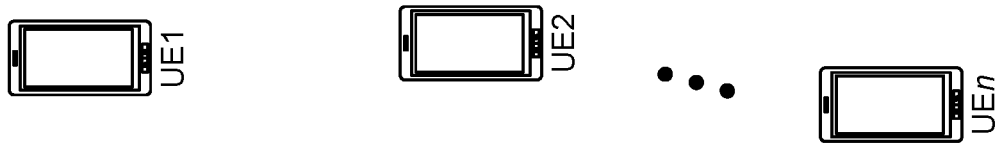
Figure 3A:
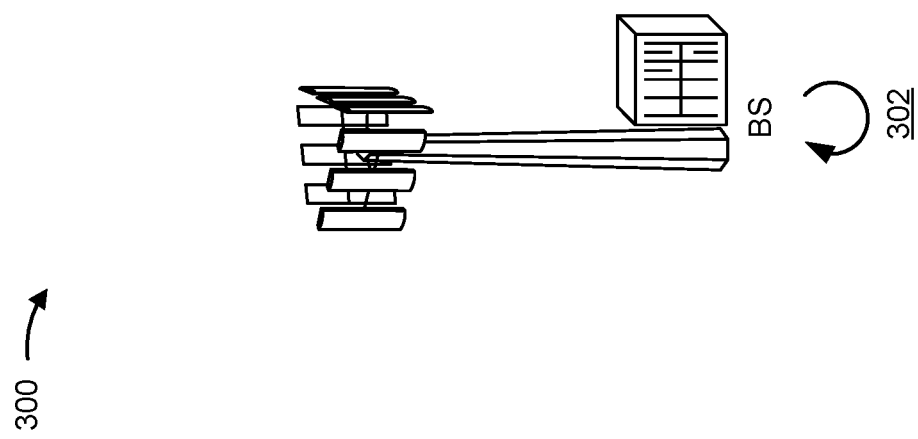

As shown in FIG. 3A, and by reference number 302, the BS may distribute PUCCH signaling information across a PDCCH component and a PDSCH component of a msgB communication by configuring the PDCCH component to include a first portion of the PUCCH signaling information, and by configuring the PDSCH component to include a second portion of the PUCCH signaling information. The PUCCH signaling information may include various parameters for one or more UEs to transmit HARQ feedback based at least in part on the msgB communication, such as a PUCCH resource allocation, a PDSCH to HARQ timing indication, a PUCCH power control command, and/or the like.

The PUCCH resource allocation may identify one or more time-domain and/or frequency-domain resources in which the one or more UEs are to transmit the HARQ feedback to the BS. The one or more time-domain resources may include one or more slots, one or more symbols, and/or the like. The one or more frequency-domain resources may include one or more sub-carriers, one or more resource blocks, one or more resource elements, and/or the like. The PDSCH to HARQ timing indication may identify a timing offset between the PUSCH component of the msgB communication and a time at which the one or more UEs are to transmit the HARQ feedback. The PUCCH power control command may identify a transmit power for transmitting the HARQ feedback on an uplink.

In some aspects, the PUCCH signaling information may include one or more common components and/or one or more UE-specific components. The common components may include PUCCH signaling information directed to a plurality or group of UEs, and may include a common PUCCH resource allocation, a common PDSCH to HARQ timing indication, a common PUCCH power control command, and/or the like. The one or more UE-specific components may be directed to a particular UE, and may include a UE-specific PUCCH resource allocation, a UE-specific PDSCH to HARQ timing indication, a UE-specific PUCCH power control command, and/or the like.

In some aspects, each component of the PUCCH signaling information may be represented by a set of bits in the msgB communication. Examples include 4 bits for a PUCCH resource allocation, 3 bits for a PDSCH to HARQ timing indication, 2 bits for a PUCCH power control command, and/or the like.

Figure 3B:
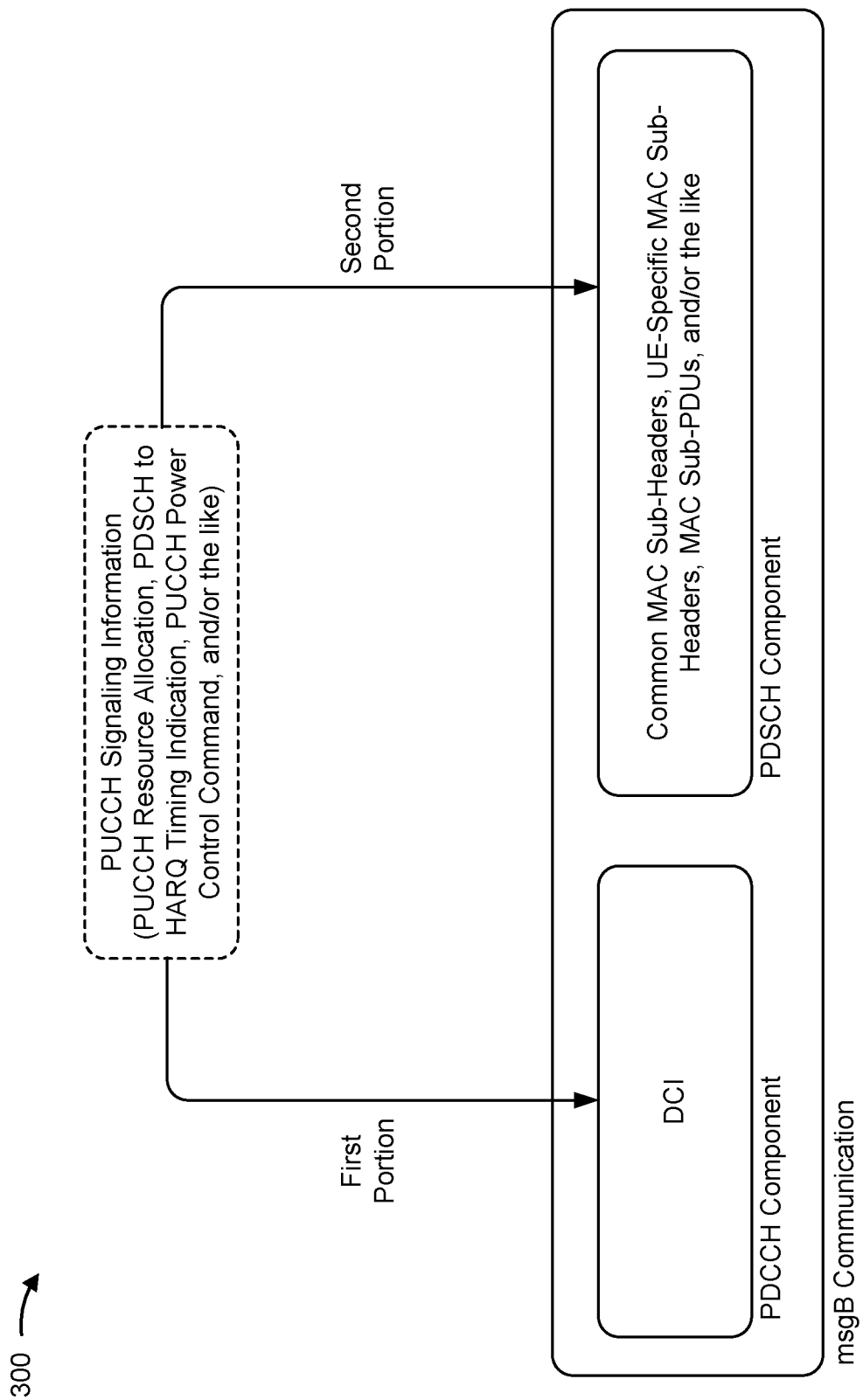

FIG. 3B illustrates an example distribution of PUCCH signaling information across the PDCCH component and the PDSCH component of the msgB communication. As shown in FIG. 3B, the first portion of the PUCCH signaling information may be included in DCI in the PDCCH component. As further shown in FIG. 3B, the second portion of the PUCCH signaling information may be included in one or more locations in the PDSCHcomponent, such as one or more common MAC sub-headers, one or more UE-specific MAC sub-headers, one or more MAC sub-PDUs, and/or the like.

In some aspects, the first portion may include one or more common components of the PUCCH signaling information. In some aspects, the second portion may include one or more common components and/or one or more UE-specific parameters of the PUCCH signaling information. The one or more common parameters included in the second portion may be included in one or more common MAC sub-headers, the one or more UE-specific components may be included in one or more UE-specific MAC sub-headers and/or one or more MAC sub-PDUs, and/or the like.

In some aspects, a particular component of the PUCCH signaling information may be distributed across the PDCCH component and the PDSCH component of the msgB communication. For example, a first subset of the set of bits for a common PUCCH resource allocation may be included in the PDCCH component (e.g., in DCI) and a second subset of the set of bits for the common PUCCH resource allocation may be included in the PDSCH component (e.g., in one or more common MAC sub-headers). In some aspects, a particular component of the PUCCH signaling information may be distributed within the PDSCH component of the msgB communication. For example, a first subset of the bits for a UE-specific PDSCH to HARQ timing indication may be included in one or more UE-specific sub-headers and/or one or more MAC sub-PDUs.

In some aspects, the PUCCH signaling information may be distributed across the first portion and the second portion in a manner that reduces, minimizes, and/or otherwise avoids the addition of extra padding to the PDCCH component and the PDSCH component of the msgB communication. For example, the BS may make use of reserved bits in the DCI as opposed to introducing a new DCI format that includes extra bits for the first portion of the PUCCH information, and may make use of reserved bits in one or more MAC sub-headers and/or MAC sub-PDUs as opposed to increasing the size of MAC sub-headers and/or the size of MAC sub-PDUs that are used in the msgB communication. As another example, if the DCI, MAC sub-headers, and/or MAC sub-PDUs are byte-aligned, the BS may distribute the PUCCH signaling information across the first portion and the second portion in a manner that ensures the DCI, MAC sub-headers, and/or MAC sub-PDUs are byte-aligned with the addition of minimal padding.

In some aspects, the BS may further include Signaling information for MAC sub-PDU combining in the msgB communication. The Signaling information for MAC sub-PDU combining may include various parameters that may permit the one or more UEs to perform MAC sub-PDU combining as part of HARQ processing for the msgB communication, such as a redundancy version associated with the msgB communication, a HARQ process identifier associated with the msgB communication, a new data indicator associated with the msgB communication, and/or the like. The BS may distribute the Signaling information for MAC sub-PDU combining across the PDCCH component and the PDSCH component of the msgB communication in a manner similar to the PUCCH signaling information. For example, the BS may include a first portion of the Signaling information for MAC sub-PDU combining in the PDCCH component (e.g., DCI) of the msgB communication, and may include a second portion of the Signaling information for MAC sub-PDU combining in the PDSCH component (e.g., one or more common MAC sub-headers, one or more UE-specific MAC sub-headers, one or more MAC sub-PDUs, and/or the like) of the msgB communication.

FIGS. 3C and 3D illustrate examples of common MAC sub-headers that may be included in a PDSCH component of the msgB communication. Other examples of common MAC sub-headers may be used in the msgB communication and/or other communications. A common MAC sub-header may be used in place (or in addition to) one or more UE-specific MAC sub-headers for one or more MAC sub-PDUs. In other words, a common MAC sub-header may be used to provide header information for a plurality of MAC sub-PDUs associated with the common MAC sub-header. As an example, a common MAC sub-header may be used to group a plurality of MAC sub-PDUs carrying the same type of RAR. In this way, the PDSCH component may include a plurality of groups of MAC sub-PDUs, where each group of MAC sub-PDUs is grouped under a single common MAC sub-header based at least in part on RAR type.

As shown in FIG. 3C, an example common MAC sub-header may include a plurality of fields, such as a last MAC sub-PDU indicator field, a RAR type indicator field, a quantity of RARs field, a common PUCCH signaling information field, and/or the like. The last MAC sub-PUD indicator field may be used to indicate that a MAC sub-PDU associated with the common MAC sub-header is a last MAC sub-PDU included in the MAC PDU of the PDSCH component of the msgB communication. In this case, the last MAC sub-PDU indicator field may include a flag (e.g., an "E" flag and/or another type of flag) a bit (e.g., a 0 or a 1), and/or the like to identify the end of the MAC PDU.

As further shown in FIG. 3C, the RAR type indicator may include a one or more bits identifying the RAR type of the RARs carried by the MAC sub-PDUs grouped under the common MAC sub-header. The quantity of RARs field may include one or more bits identifying the quantity of RARs (and thus, the quantity of MAC sub-PDUs) grouped under the common MAC sub-header. The common PUCCH signaling information field may include one or more bits for indicating common PUCCH signaling information for the UEs to which the RARs grouped under the common MAC sub-header are directed.

As shown in FIG. 3D, an example common MAC sub-header may include a plurality of fields, such as a RAR type indicator field, a quantity of RARs field, a common PUCCH signaling information field, and/or the like. Since a last MAC sub-PUD indicator field is not included, a greater quantity of bits may be allocated to the common PUCCH signaling information field. In this case, the BS may implicitly indicate the end of the MAC PDU of the msgB communication by placing a MAC sub-header (e.g., either common or UE-specific) associated with a MAC sub-PDU carrying a backoff indicator at the end of the MAC PDU.

FIG. 3E illustrates various example RAR types that may be indicated by a RAR type indicator field in a common MAC sub-header. As shown in FIG. 3E, RAR type indicator field may include (Bit 1, Bit 2), where (1, 1) corresponds to a backoff indicator RAR type, (1, 0) corresponds to a fallback RAR type, (0, 1) corresponds to a success RAR with an associated RRC message type, and (0, 0) corresponds to a success RAR without an associated RRC message type. Other configurations for RAR type and associated RAR type indicator may be used, other RAR types may be indicated by a RAR type indicator field, a greater or fewer quantity of bits may be included in a RAR type indicator field, and/or the like.

Figure 3F:
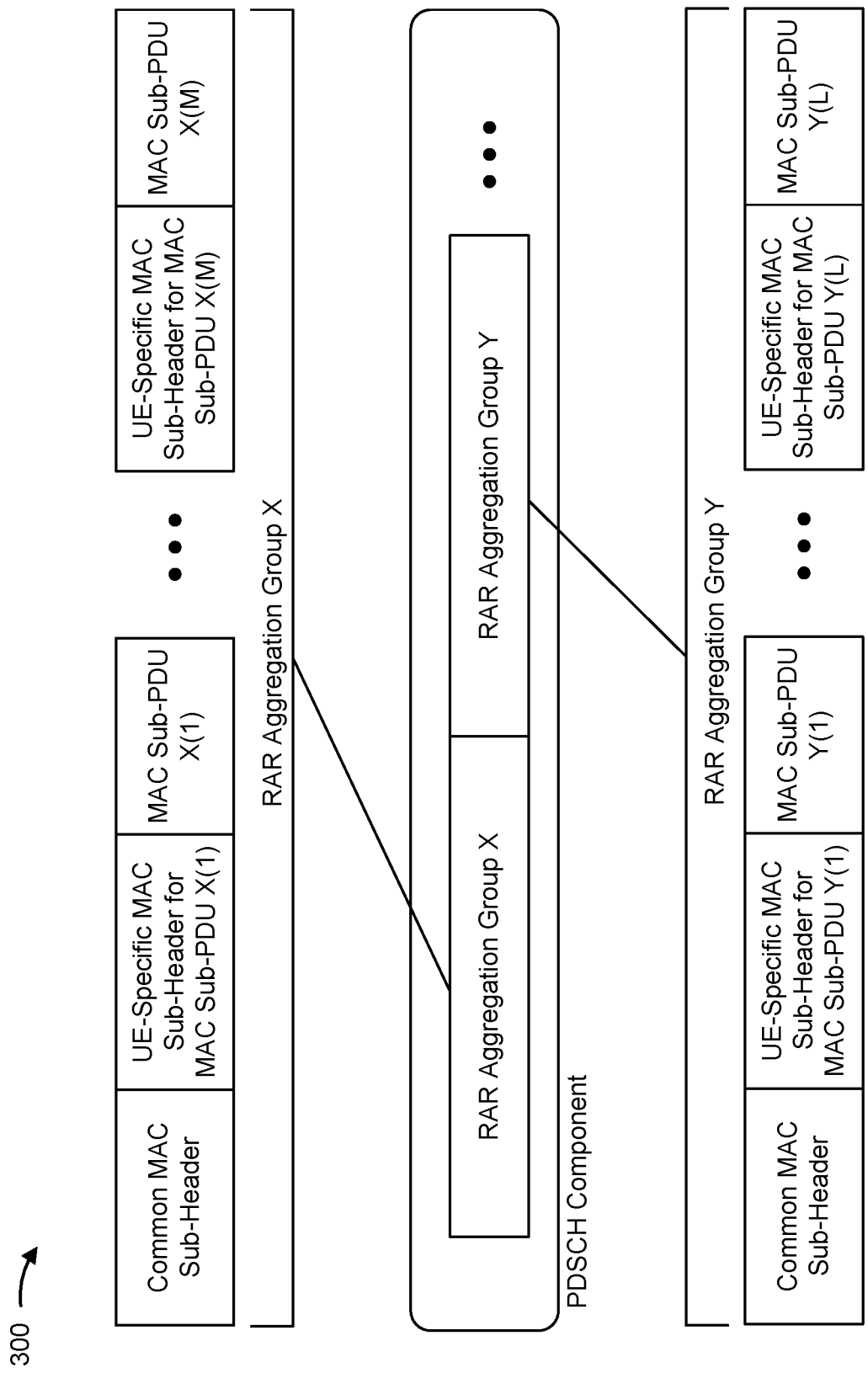

FIG. 3F illustrates an example configuration of a plurality of RAR aggregation groups in the PDSCH component of the msgB communication. The plurality of RAR aggregation groups may include RAR aggregation group X, RAR aggregation group Y, and/or other RAR aggregation groups. Each RAR aggregation group may include a common MAC sub-header and one or more MAC sub-PDUs carrying RARs of the same RAR type. In some aspects, a msgB communication may include greater, fewer, and/or different configurations of RAR aggregation groups.

As shown in FIG. 3F, RAR aggregation group X may include a common MAC sub-header that identifies the RAR type and the quantity of RARs in the MAC sub-PDUs X(1) through X(M) grouped under the common MAC sub-header. Similarly, RAR aggregation group Y may include a common MAC sub-header that identifies the RAR type and the quantity of RARs in the MAC sub-PDUs Y(1) through Y(L) grouped under the common MAC sub-header. In some aspects, RAR aggregation group X may include UE-specific MAC sub-headers for each of MAC sub-PDU X(1) through X(M) or a subset thereof that carry UE-specific information for the associated MAC sub-PDU. Similarly, RAR aggregation group Y may include UE-specific MAC sub-headers for each of MAC sub-PDU Y(1) through Y(L) or a subset thereof.

Figure 3G:
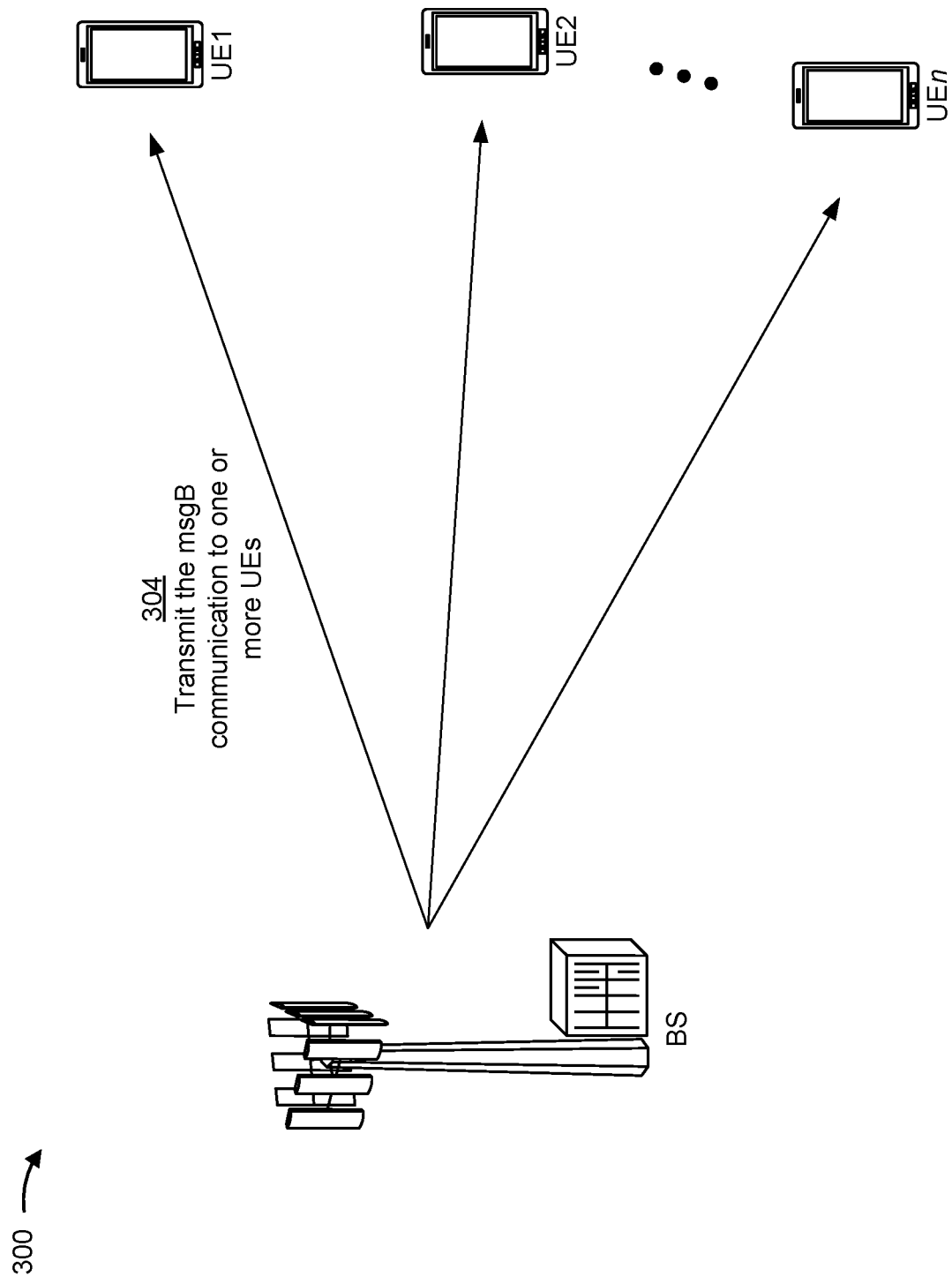

As shown in FIG. 3G, and by reference number 304, the BS may transmit the msgB communication to one or more UEs. In some aspects, if the msgB communication is directed to a particular UE, the BS may unicast the msgB communication to the UE. In some aspects, if the msgB communication is directed to a plurality of UEs, the BS may multicast the msgB communication to the plurality of UEs.

A UE (e.g., UE1) may receive the msgB communication, may identify the first portion of the PUCCH signaling information in the PDCCH component of the msgB communication, and may identify the second portion of the PUCCH signaling information in the PDSCH portion of the msgB communication. For example, the UE may identify the first portion in DCI in the PDCCHcomponent, and may identify the second portion in one or more common MAC sub-headers, one or more UE-specific MAC sub-headers, one or more MAC sub-PDUs, and/or the like. The UE may transmit, to the BS, HARQ feedback (e.g., ACK or NACK) for the msgB communication in the time-domain resources and/or frequency-domain resources identified in the PUCCH resource allocation of the PUCCH signaling information, may transmit the HARQ feedback based at least in part on the timing offset identified by the PDSCH to HARQ timing indication identified in the PUCCH signaling information, may transmit the HARQ feedback at the transmit power identified by the PUCCH power control command in the PUCCH signaling information, and/or the like.

Moreover, the UE may identify the first portion of the Signaling information for MAC sub-PDU combining in the PDCCH component of the msgB communication, and may identify the second portion of the Signaling information for MAC sub-PDU combining in the PDSCH component of the msgB communication. For example, the UE may identify the first portion in DCI in the PDCCHcomponent, and may identify the second portion in one or more common MAC sub-headers, one or more UE-specific MAC sub-headers, one or more MAC sub-PDUs, and/or the like. The UE may perform MAC sub-PDU combining as part of the HARQ process of the UE based at least in part the redundancy version identified in the Signaling information for MAC sub-PDU combining, the new data indicator identified in the Signaling information for MAC sub-PDU combining, the HARQ process identifier identified in the Signaling information for MAC sub-PDU combining, and/or the like.

In this way, the BS may distribute the PUCCH signaling information across the PDCCH component and the PDSCH component of the msgB communication. This permits the BS to maintain the size of existing DCI formats while including PUCCH signaling information directed to the plurality of UEs in a single msgB communication. Moreover, Signaling information for MAC sub-PDU combining may be distributed across the PDCCH component and the PDSCH component in a similar manner to increase the ability of the plurality of UEs to perform MAC sub-PDU combining as part of a HARQ process. Moreover, the BS may use a common MAC sub-header to aggregate and/or group a plurality of MAC sub-PDUs carrying the same type of RAR, as well as to carry common PUCCH signaling information for the plurality of UEs. The common MAC sub-header may reduce overhead of the overall MAC PDU in the PDSCH component of the msgB communication by reducing the quantity of MAC sub-headers in the MAC PDU (e.g., relative to including a respective MAC sub-header for each of the MAC sub-PDUs), by permitting common PUCCH signaling information to be included in a single location or fewer locations in the PDSCH component, and/or the like.

As indicated above, FIGS. 3A-3G are provided as one or more examples. Other examples may differ from what is described with respect to FIGS. 3A-3G.

Figure 4:
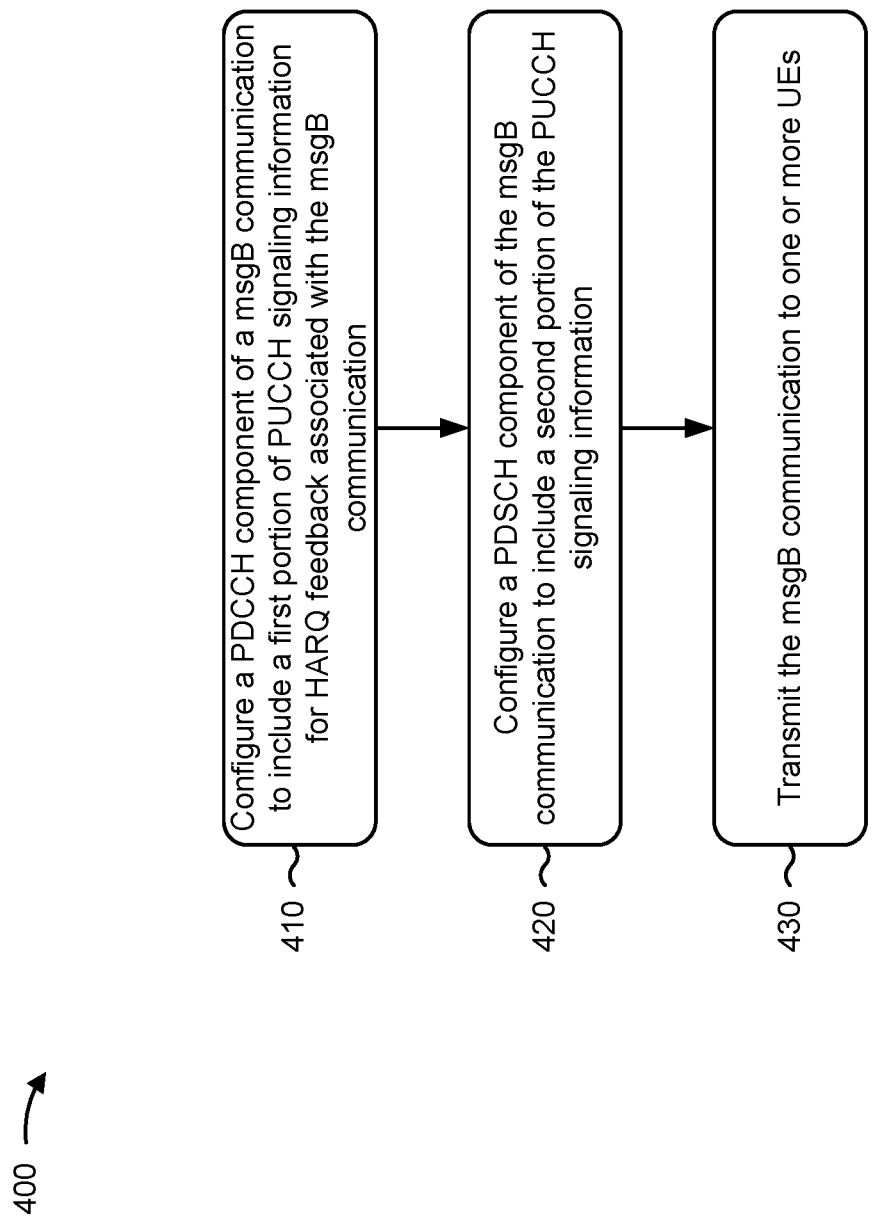
FIG. 4 is a diagram illustrating an example process performed, for example, by a BS, in accordance with various aspects of the present disclosure.

FIG. 4 is a diagram illustrating an example process 400 performed, for example, by a BS, in accordance with various aspects of the present disclosure. Example process 400 is an example where the BS (e.g., BS 110) performs operations associated with configuring a msgB channel structure.

As shown in FIG. 4, in some aspects, process 400 may include configuring a PDCCH component of a msgB communication to include a first portion of PUCCH signaling information for HARQ feedback associated with the msgB communication (block 410). For example, the BS (e.g., using transmit processor 220, receive processor 238, controller/processor 240, memory 242, and/or the like) may configure a PDCCH component of a msgB communication to include a first portion of PUCCH signaling information for HARQ feedback associated with the msgB communication, as described above.

As further shown in FIG. 4, in some aspects, process 400 may include configuring a PDSCH component of the msgB communication to include a second portion of the PUCCH signaling information (block 420). For example, the BS (e.g., using transmit processor 220, receive processor 238, controller/processor 240, memory 242, and/or the like) may configure a PDSCH component of the msgB communication to include a second portion of the PUCCH signaling information, as described above.

As further shown in FIG. 4, in some aspects, process 400 may include transmitting the msgB communication to one or more UEs (block 430). For example, the BS (e.g., using transmit processor 220, receive processor 238, controller/processor 240, memory 242, and/or the like) may transmit the msgB communication to one or more UEs, as described above.

Process 400 may include additional aspects, such as any single aspect or any combination of aspects described below and/or in connection with one or more other processes described elsewhere herein.

In a first aspect, the first portion of the PUCCH signaling information is included in downlink control information in the PDCCH component of the msgB communication. In a second aspect, alone or in combination with the first aspect, the first portion of the PUCCH signaling information includes at least one of at least a portion of a first set of bits indicating a common PUCCH resource allocation for the one or more UEs, at least a portion of a second set of bits indicating a common PDSCH to HARQ timing indication for the one more UEs, or at least a portion of a third set of bits indicating a common PUCCH power control command for the one or more UEs. In a third aspect, alone or in combination with one or more of the first and second aspects, the second portion of the PUCCH signaling information is included in at least one of a common MAC sub-header in the PDSCH component of the msgB communication, a UE-specific MAC sub-header in the PDSCH component of the msgB communication, or a MAC sub-protocol data unit in the PDSCH component of the msgB communication.

In a fourth aspect, alone or in combination with one or more of the first through third aspects, the second portion of the PUCCH signaling information includes at least one of at least a portion of a first set of bits indicating a common PUCCH resource allocation for the one or more UEs, at least a portion of a second set of bits indicating a common PDSCH to HARQ timing indication for the one more UEs, at least a portion of a third set of bits indicating a common PUCCH power control command for the one or more UEs, at least a portion of a fourth set of bits indicating a UE-specific PUCCH resource allocation for a UE of the one or more UEs, at least a portion of a fifth set of bits indicating a UE-specific PDSCH to HARQ timing indication for the UE of the one or more UEs, or at least a portion of a sixth set of bits indicating a UE-specific PUCCH power control command for the UE of the one or more UEs.

In a fifth aspect, alone or in combination with one or more of the first through fourth aspects, one or more common components of the PUCCH signaling information are included in at least one of the first portion of the PUCCH signaling information, or a first subset of the second portion of the PUCCH signaling information included in a common MAC sub-header in the PDSCH component of the msgB communication, and one or more UE-specific components of the PUCCH signaling information are included in at least one of a second subset of the second portion of the PUCCH signaling information included in a UE-specific MAC sub-header in the PDSCH component of the msgB communication, or a third subset of the second portion of the PUCCH signaling information included in a MAC sub-protocol data unit in the PDSCH component of the msgB communication.

In a sixth aspect, alone or in combination with one or more of the first through fifth aspects, the first portion of the PUCCH signaling information is included in one or more reserved bits in downlink control information in the PDCCH component of the msgB communication to reduce padding added to the PDCCH component of the msgB communication, and the second portion of the PUCCH signaling information is included in one or more reserved bits in at least one of a MAC sub-header in the PDSCH component of the msgB communication or a MAC sub-protocol data unit the PDSCH component of the msgB communication to minimize padding added to the PDSCH component of the msgB communication.

In a seventh aspect, alone or in combination with one or more of the first through sixth aspects, a subset of the second portion of the PUCCH signaling information is included in a common MAC sub-header in the PDSCH component of the msgB communication, and process 400 further comprises configuring the PDSCH component of the msgB communication to include a plurality of MAC sub-PDUs associated with the common MAC sub-header, wherein each of the plurality of MAC sub-PDUs is associated with a respective UE of the one or more UEs, and configuring the common MAC sub-header to indicate a RAR type associated with the plurality of MAC sub-PDUs and a quantity of the plurality of MAC sub-PDUs. In an eighth aspect, alone or in combination with one or more of the first through seventh aspects, process 400 further comprises configuring the common MAC sub-header to include a field that indicates the common MAC sub-header is at an end of a MAC PDU of the PDSCH component of the msgB communication.

In a ninth aspect, alone or in combination with one or more of the first through eighth aspects, process 400 further comprises configuring a backoff indicator MAC sub-header to be located at an end of a MAC PDU of the PDSCH component of the msgB communication to identify the end of the MAC PDU. In a tenth aspect, alone or in combination with one or more of the first through ninth aspects, the plurality of MAC sub-PDUs are located after the common MAC sub-header in a MAC PDU of the PDSCH component of the msgB communication. In an eleventh aspect, alone or in combination with one or more of the first through tenth aspects, another subset of the second portion of the PUCCH signaling information is included in a plurality of UE-specific MAC sub-headers in the PDSCH component of the msgB communication, and each of the plurality of UE-specific MAC sub-headers is associated with a respective MAC sub-PDU of the plurality of MAC sub-PDUs.

In a twelfth aspect, alone or in combination with one or more of the first through eleventh aspects, the RAR type includes a backoff indicator, a fallback RAR, a success RAR with an associated RRC message, or a success RAR without an RRC message. In a thirteenth aspect, alone or in combination with one or more of the first through twelfth aspects, process 400 father comprises configuring the PDCCH component of the msgB communication to include a first portion of Signaling information for MAC sub-PDU combining; and configuring the PDSCH component of the msgB communication to include a second portion of the Signaling information for MAC sub-PDU combining.

In a fourteenth aspect, alone or in combination with one or more of the first through thirteenth aspects, the first portion of the Signaling information for MAC sub-PDU combining is included in downlink control information in the PDCCH component of the msgB communication. In a fifteenth aspect, alone or in combination with one or more of the first through fourteenth aspects, the Signaling information for MAC sub-PDU combining includes at least one of the second portion of the Signaling information for MAC sub-PDU combining is included in at least one of a MAC sub-header in the PDSCH component of the msgB communication or a MAC sub-PDU in the PDSCH component of the msgB communication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
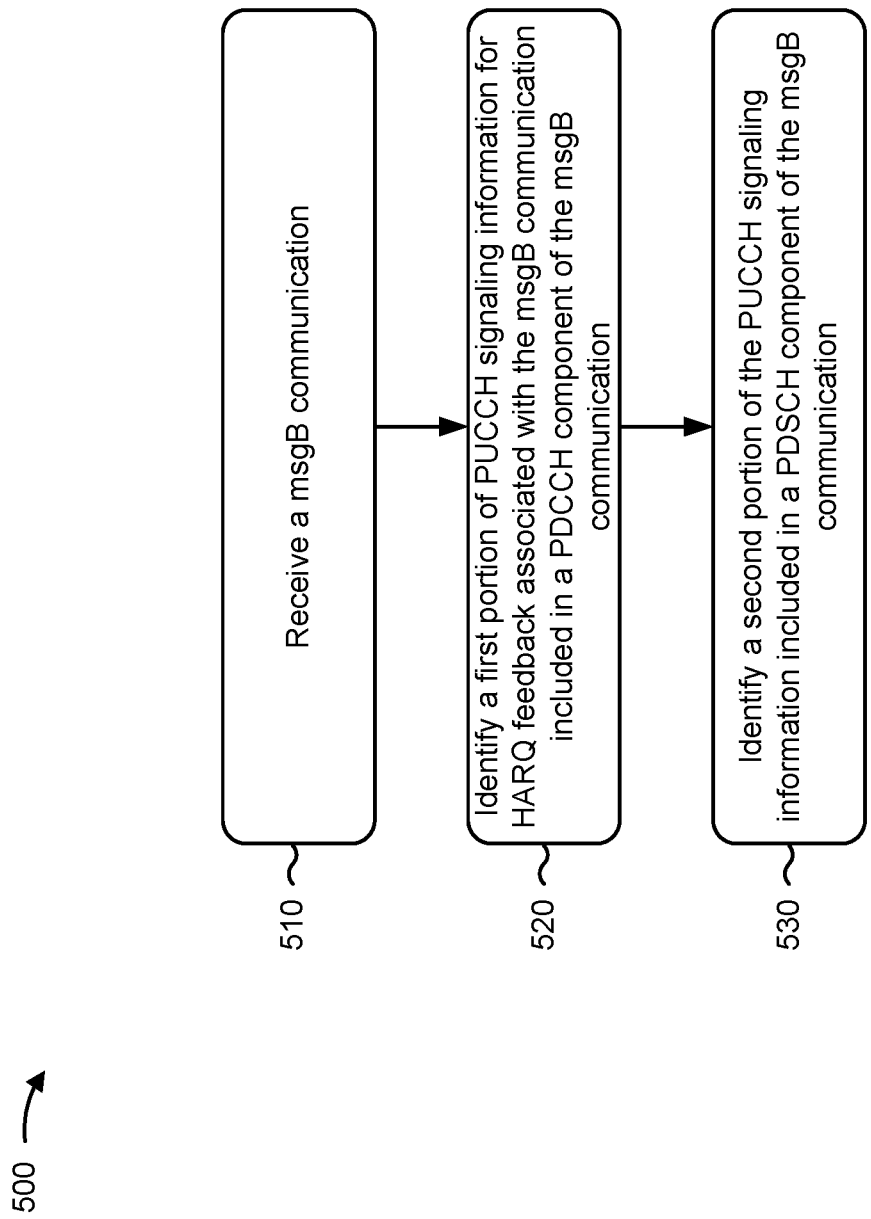
FIG. 5 is a diagram illustrating an example process performed, for example, by a BS, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with configuring a msgB channel structure.

As shown in FIG. 5, in some aspects, process 500 may include receiving a msgB communication (block 510). For example, the UE (e.g., using receive processor 258, transmit processor 264, controller/processor 280, memory 282, and/or the like) may receive a msgB communication, as described above.

As further shown in FIG. 5, in some aspects, process 500 may include identifying a first portion of PUCCH signaling information for HARQ feedback associated with the msgB communication included in a PDCCH component of the msgB communication (block 520). For example, the UE (e.g., using receive processor 258, transmit processor 264, controller/processor 280, memory 282, and/or the like) may identify a first portion of PUCCH signaling information for HARQ feedback associated with the msgB communication included in a PDCCH component of the msgB communication, as described above.

As further shown in FIG. 5, in some aspects, process 500 may include identifying a second portion of the PUCCH signaling information included in a PDSCH component of the msgB communication (block 530). For example, the UE (e.g., using receive processor 258, transmit processor 264, controller/processor 280, memory 282, and/or the like) may identify a second portion of the PUCCH signaling information included in a PDSCH component of the msgB communication, as described above.

Process 500 may include additional aspects, such as any single aspect or any combination of aspects described below and/or in connection with one or more other processes described elsewhere herein.

In a first aspect, the first portion of the PUCCH signaling information is included in downlink control information in the PDCCH component of the msgB communication. In a second aspect, alone or in combination with the first aspect, the first portion of the PUCCH signaling information includes at least one of at least a portion of a first set of bits indicating a common PUCCH resource allocation for a plurality of UEs in which the UE is included, at least a portion of a second set of bits indicating a common PDSCH to HARQ timing indication for the plurality of UEs, or at least a portion of a third set of bits indicating a common PUCCH power control command for the plurality of UEs. In a third aspect, alone or in combination with one or more of the first and second aspects, the second portion of the PUCCH signaling information is included in at least one of a common MAC sub-header in the PDSCH component of the msgB communication, a UE-specific MAC sub-header in the PDSCH component of the msgB communication, or a MAC sub-protocol data unit in the PDSCH component of the msgB communication.

In a fourth aspect, alone or in combination with one or more of the first through third aspects, the second portion of the PUCCH signaling information includes at least one of at least a portion of a first set of bits indicating a common PUCCH resource allocation for a plurality of UEs in which the UE is included, at least a portion of a second set of bits indicating a common PDSCH to HARQ timing indication for the plurality of UEs, at least a portion of a third set of bits indicating a common PUCCH power control command for the plurality of UEs, at least a portion of a fourth set of bits indicating a UE-specific PUCCH resource allocation for the UE, at least a portion of a fifth set of bits indicating a UE-specific PDSCH to HARQ timing indication for the UE, or at least a portion of a sixth set of bits indicating a UE-specific PUCCH power control command for the UE.

In a fifth aspect, alone or in combination with one or more of the first through fourth aspects, one or more common components of the PUCCH signaling information are included in at least one of the first portion of the PUCCH signaling information or a first subset of the second portion of the PUCCH signaling information included in a common MAC sub-header in the PDSCH component of the msgB communication, and one or more UE-specific components of the PUCCH signaling information are included in at least one of a second subset of the second portion of the PUCCH signaling information included in a UE-specific MAC sub-header in the PDSCH component of the msgB communication or a third subset of the second portion of the PUCCH signaling information included in a MAC sub-protocol data unit in the PDSCH component of the msgB communication.

In a sixth aspect, alone or in combination with one or more of the first through fifth aspects, the first portion of the PUCCH signaling information is included in one or more reserved bits in downlink control information in the PDCCH component of the msgB communication to reduce padding added to the PDCCH component of the msgB communication and the second portion of the PUCCH signaling information is included in one or more reserved bits in at least one of a MAC sub-header in the PDSCH component of the msgB communication or a MAC sub-protocol data unit the PDSCH component of the msgB communication to minimize padding added to the PDSCH component of the msgB communication. In a seventh aspect, alone or in combination with one or more of the first through sixth aspects, process 500 further comprises identifying a first portion of Signaling information for MAC sub-PDU combining included in the PDCCH component of the msgB communication; and identifying a second portion of the Signaling information for MAC sub-PDU combining included in the PDSCH component of the msgB communication.

In an eighth aspect, alone or in combination with one or more of the first through seventh aspects, the first portion of the Signaling information for MAC sub-PDU combining is included in downlink control information in the PDCCH component of the msgB communication, and the second portion of the Signaling information for MAC sub-PDU combining is included in at least one of a MAC sub-header in the PDSCH component of the msgB communication, or a MAC sub-PDU in the PDSCH component of the msgB communication. In a ninth aspect, alone or in combination with one or more of the first through eighth aspects, the Signaling information for MAC sub-PDU combining includes at least one of a redundancy version associated with the msgB communication, a HARQ process identifier associated with the msgB communication, or a new data indicator associated with the msgB communication.

In a tenth aspect, alone or in combination with one or more of the first through ninth aspects, process 500 further comprises receiving an indication of a mapping of the first portion to the PDCCH component and the second portion to the PDSCH component in at least one of system information, radio resource control signaling, or downlink control signaling. In an eleventh aspect, alone or in combination with one or more of the first through tenths aspects, a mapping of the first portion to the PDCCH component and the second portion to the PDSCH component is hard coded at the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
configuring a physical downlink control channel (PDCCH) component of a message B (msgB) communication to include a first portion of physical uplink control channel (PUCCH) signaling information for hybrid automatic repeat request (HARQ) feedback and signaling information for medium access control (MAC) sub-protocol data unit (sub-PDU) combining associated with the msgB communication;
configuring a physical downlink shared channel (PDSCH) component of the msgB communication to include a second portion of the PUCCH signaling information, wherein the second portion of the PUCCH signaling information is included in at least one of:
a common MAC sub-header in the PDSCH component of the msgB communication,
a UE-specific MAC sub-header in the PDSCH component of the msgB communication, or
a MAC sub-PDU in the PDSCH component of the msgB communication; and
transmitting the msgB communication to one or more user equipment (UEs).

2. The method of claim 1, wherein the first portion of the PUCCH signaling information is included in downlink control information in the PDCCH component of the msgB communication.

3. The method of claim 1, wherein the first portion of the PUCCH signaling information includes at least one of:
at least a portion of a first set of bits indicating a common PUCCH resource allocation for the one or more UEs,
at least a portion of a second set of bits indicating a common PDSCH to HARQ timing indication for the one more UEs, or
at least a portion of a third set of bits indicating a common PUCCH power control command for the one or more UEs.

4. The method of claim 1, wherein the second portion of the PUCCH signaling information includes at least one of:
at least a portion of a first set of bits indicating a common PUCCH resource allocation for the one or more UEs,
at least a portion of a second set of bits indicating a common PDSCH to HARQ timing indication for the one or more UEs,
at least a portion of a third set of bits indicating a common PUCCH power control command for the one or more UEs,
at least a portion of a fourth set of bits indicating a UE-specific PUCCH resource allocation for a UE of the one or more UEs,
at least a portion of a fifth set of bits indicating a UE-specific PDSCH to HARQ timing indication for the UE of the one or more UEs, or
at least a portion of a sixth set of bits indicating a UE-specific PUCCH power control command for the UE of the one or more UEs.

5. The method of claim 1, wherein one or more common components of the PUCCH signaling information are included in at least one of:
the first portion of the PUCCH signaling information, or
a first subset of the second portion of the PUCCH signaling information included in the common MAC sub-header in the PDSCH component of the msgB communication; and
wherein one or more UE-specific components of the PUCCH signaling information are included in at least one of:
a second subset of the second portion of the PUCCH signaling information included in the UE-specific MAC sub-header in the PDSCH component of the msgB communication, or
a third subset of the second portion of the PUCCH signaling information included in the MAC sub-PDU in the PDSCH component of the msgB communication.

6. The method of claim 1, wherein the first portion of the PUCCH signaling information is included in one or more reserved fields, unused fields or new fields in downlink control information (DCI) in the PDCCH component of the msgB communication to reduce padding added to the PDCCH component of the msgB communication; and
wherein the second portion of the PUCCH signaling information is included in one or more reserved fields or new fields in at least one of a MAC sub-header in the PDSCH component of the msgB communication or the MAC sub-PDU in the PDSCH component of the msgB communication to reduce padding added to the PDSCH component of the msgB communication.

7. A method of wireless communication performed by a user equipment (UE), comprising:
receiving a message B (msgB) communication;
identifying a first portion of physical uplink control channel (PUCCH) signaling information for hybrid automatic repeat request (HARQ) feedback and signaling information associated with medium access control (MAC) sub-protocol data unit (sub-PDU) combining associated with the msgB communication included in a physical downlink control channel (PDCCH) component of the msgB communication; and
identifying a second portion of the PUCCH signaling information included in a physical downlink shared channel (PDSCH) component of the msgB communication,
wherein the second portion of the PUCCH signaling information is included in at least one of:
a common MAC sub-header in the PDSCH component of the msgB communication,
a UE-specific MAC sub-header in the PDSCH component of the msgB communication, or
a MAC sub-PDU in the PDSCH component of the msgB communication.

8. The method of claim 7, wherein mapping of signaling information for PUCCH and HARQ combining can be indicated by system information, radio resource control (RRC) signaling, or hard-coded in a specification, and
wherein the first portion of the PUCCH signaling information is included in downlink control information in the PDCCH component of the msgB communication.

9. The method of claim 7, wherein the first portion of the PUCCH signaling information includes at least one of:
at least a portion of a first set of bits indicating a common PUCCH resource allocation for a plurality of UEs in which the UE is included,
at least a portion of a second set of bits indicating a common PDSCH to HARQ timing indication for the plurality of UEs, or at least a portion of a third set of bits indicating a common PUCCH power control command for the plurality of UEs.

10. The method of claim 7, wherein the second portion of the PUCCH signaling information includes at least one of:
   at least a portion of a first set of bits indicating a common PUCCH resource allocation for a plurality of UEs in which the UE is included,
   at least a portion of a second set of bits indicating a common PDSCH to HARQ timing indication for the plurality of UEs,
   at least a portion of a third set of bits indicating a common PUCCH power control command for the plurality of UEs,
   at least a portion of a fourth set of bits indicating a UE-specific PUCCH resource allocation for the UE,
   at least a portion of a fifth set of bits indicating a UE-specific PDSCH to HARQ timing indication for the UE, or
   at least a portion of a sixth set of bits indicating a UE-specific PUCCH power control command for the UE.

11. The method of claim 7, wherein one or more common components of the PUCCH signaling information are included in at least one of:
   the first portion of the PUCCH signaling information, or
   a first subset of the second portion of the PUCCH signaling information included in the common MAC sub-header in the PDSCH component of the msgB communication; and
   wherein one or more UE-specific components of the PUCCH signaling information are included in at least one of:
   a second subset of the second portion of the PUCCH signaling information included in the UE-specific MAC sub-header in the PDSCH component of the msgB communication, or
   a third subset of the second portion of the PUCCH signaling information included in the MAC sub-PDU in the PDSCH component of the msgB communication.

12. The method of claim 7, wherein the first portion of the PUCCH signaling information is included in one or more reserved bits in downlink control information in the PDCCH component of the msgB communication to reduce padding added to the PDCCH component of the msgB communication; and
   wherein the second portion of the PUCCH signaling information is included in one or more reserved bits in at least one of a MAC sub-header in the PDSCH component of the msgB communication or the MAC sub-PDU the PDSCH component of the msgB communication to minimize padding added to the PDSCH component of the msgB communication.

13. A network entity for wireless communication, comprising:
   one or more memories; and
   one or more processors operatively coupled to the one or more memories, the one or more memories and the one or more processors individually or collectively configured to:
      configure a physical downlink control channel (PDCCH) component of a message B (msgB) communication to include a first portion of physical uplink control channel (PUCCH) signaling information for hybrid automatic repeat request (HARQ) feedback associated with the msgB communication and a portion of signaling information for medium access control (MAC) sub-protocol data unit (sub-PDU) combining associated with the msgB communication;
      configure a physical downlink shared channel (PDSCH) component of the msgB communication to include a second portion of the PUCCH signaling information,
         wherein the second portion of the PUCCH signaling information is included in at least one of:
            a common MAC sub-header in the PDSCH component of the msgB communication,
            a UE-specific MAC sub-header in the PDSCH component of the msgB communication, or
            a MAC sub-PDU in the PDSCH component of the msgB communication; and
      transmit the msgB communication to one or more user equipment (UEs).

14. The network entity of claim 13, wherein a subset of the second portion of the PUCCH signaling information is included in the common MAC sub-header in the PDSCH component of the msgB communication; and
   wherein the one or more processors individually or collectively are further configured to:
      configure the PDSCH component of the msgB communication to include a plurality of MAC sub-PDUs associated with the common MAC sub-header,
         wherein each of the plurality of MAC sub-PDUs is associated with a respective UE of the one or more UEs; and
      configuring the common MAC sub-header to indicate:
         a random access response (RAR) type associated with the plurality of MAC sub-PDUs, and
         a quantity of the plurality of MAC sub-PDUs.

15. The network entity of claim 14, wherein the one or more processors individually or collectively are further configured to:
   configure the common MAC sub-header to include a field that indicates the common MAC sub-header is at an end of a MAC PDU of the PDSCH component of the msgB communication.

16. The network entity of claim 15, wherein the one or more processors individually or collectively are further configured to:
   configure a backoff indicator MAC sub-header to be located at an end of a MAC PDU of the PDSCH component of the msgB communication to identify the end of the MAC PDU.

17. The network entity of claim 14, wherein the plurality of MAC sub-PDUs are located after the common MAC sub-header in a MAC PDU of the PDSCH component of the msgB communication.

18. The network entity of claim 14, wherein another subset of the second portion of the PUCCH signaling information is included in a plurality of UE-specific MAC sub-headers in the PDSCH component of the msgB communication,
   wherein each of the plurality of UE-specific MAC sub-headers is associated with a respective MAC sub-PDU of the plurality of MAC sub-PDUs.

19. The network entity of claim 14, wherein the RAR type includes:
   a backoff indicator,
   a fallback RAR,
   a success RAR with an associated radio resource control (RRC) message, or
   a success RAR without an RRC message.

20. The network entity of claim 13, wherein the portion of the signaling information for the MAC sub-PDU combining is a first portion of the signaling information for the MAC sub-PDU combining; and
wherein the one or more processors individually or collectively are further configured to:
configure the PDSCH component of the msgB communication to include a second portion of the signaling information for the MAC sub-PDU combining.

21. The network entity of claim 20, wherein the first portion of the signaling information for the MAC sub-PDU combining is mapped to reserved fields, unused fields, or new fields of downlink control information (DCI) in the PDCCH component of the msgB communication; and
wherein the second portion of the signaling information for the MAC sub-PDU combining is included in at least one of:
a MAC sub-header in the PDSCH component of the msgB communication, or
a MAC sub-PDU in the PDSCH component of the msgB communication.

22. The network entity of claim 20, wherein the signaling information for the MAC sub-PDU combining includes at least one of:
a redundancy version associated with the msgB communication,
a HARQ process identifier associated with the msgB communication, or
a new data indicator associated with the msgB communication.

23. The network entity of claim 13, wherein the first portion of the PUCCH signaling information includes at least one of:
at least a portion of a first set of bits indicating a common PUCCH resource allocation for the one or more UEs,
at least a portion of a second set of bits indicating a common PDSCH to HARQ timing indication for the one more UEs, or
at least a portion of a third set of bits indicating a common PUCCH power control command for the one or more UEs.

24. The network entity of claim 13, wherein the second portion of the PUCCH signaling information includes at least one of:
at least a portion of a first set of bits indicating a common PUCCH resource allocation for the one or more UEs,
at least a portion of a second set of bits indicating a common PDSCH to HARQ timing indication for the one or more UEs,
at least a portion of a third set of bits indicating a common PUCCH power control command for the one or more UEs,
at least a portion of a fourth set of bits indicating a UE-specific PUCCH resource allocation for a UE of the one or more UEs,
at least a portion of a fifth set of bits indicating a UE-specific PDSCH to HARQ timing indication for the UE of the one or more UEs, or
at least a portion of a sixth set of bits indicating a UE-specific PUCCH power control command for the UE of the one or more UEs.

25. A user equipment (UE) for wireless communication, comprising:
one or more memories; and
one or more processors operatively coupled to the one or more memories, the one or more memories and the one or more processors individually or collectively configured to:
receive a message B (msgB) communication;
identify a first portion of physical uplink control channel (PUCCH) signaling information for hybrid automatic repeat request (HARQ) feedback and a portion of signaling information associated with medium access control (MAC) sub-protocol data unit (sub-PDU) combining associated with the msgB communication included in a physical downlink control channel (PDCCH) component of the msgB communication; and
identify a second portion of the PUCCH signaling information included in a physical downlink shared channel (PDSCH) component of the msgB communication,
wherein the second portion of the PUCCH signaling information is included in at least one of:
a common MAC sub-header in the PDSCH component of the msgB communication,
a UE-specific MAC sub-header in the PDSCH component of the msgB communication, or
a MAC sub-PDU in the PDSCH component of the msgB communication.

26. The UE of claim 25, wherein the portion of the signaling information for the MAC sub-PDU combining is a first portion of the signaling information for the MAC sub-PDU combining; and
wherein the one or more processors individually or collectively are further configured to:
identify a second portion of the signaling information for the MAC sub-PDU combining included in the PDSCH component of the msgB communication.

27. The UE of claim 26, wherein the first portion of the signaling information for the MAC sub-PDU combining is included in downlink control information in the PDCCH component of the msgB communication; and
wherein the second portion of the signaling information for MAC sub-PDU combining is included in at least one of:
a MAC sub-header in the PDSCH component of the msgB communication, or
the MAC sub-PDU in the PDSCH component of the msgB communication.

28. The UE of claim 26, wherein the signaling information for the MAC sub-PDU combining includes at least one of:
a redundancy version associated with the msgB communication,
a HARQ process identifier associated with the msgB communication, or
a new data indicator associated with the msgB communication.

29. The UE of claim 25, wherein the one or more processors individually or collectively are further configured to:
receive an indication of a mapping of the first portion of the PUCCH signaling information to the PDCCH component and the second portion of the PUCCH signaling information to the PDSCH component in at least one of system information, radio resource control signaling, or downlink control signaling.

30. The UE of claim 25, wherein a mapping of the first portion of the PUCCH signaling information to the PDCCH component and the second portion of the PUCCH signaling information to the PDSCH component is hard coded at the UE.

\* \* \* \* \*